Patented Oct. 24, 1933

1,931,492

UNITED STATES PATENT OFFICE 1,931,492

PRODUCTION OF HYDROGEN

William Hennicke, Ludwigshafen-on-the-Rhine, Germany, assignor to I. G. Farbenindustrie Aktiengesellschaft, Frankfort - on - the - Main, Germany No Drawing. Application February 6, 1931, Serial No. 514,070, and in Germany February 8, 1930

8 Claims. (Cl. 23—212)

The present invention relates to the production of hydrogen by splitting hydrocarbons by the action of heat.

The main object of this invention is to provide for a catalyst suitable for this reaction and which has not the inconveniences encountered with the catalysts hitherto in use.

It has already been proposed to split hydrocarbons thermally into their components for the manufacture and production of hydrogen, and to carry out the said reaction in the presence of heavy metals, such as iron, nickel or cobalt, and refractory materials such as fire clay.

Frequently, in order to produce the high temperatures necessary for the splitting, the reaction chamber, in some cases filled with a catalyst, is heated up by the combustion of suitable gases, as for example a part of the hydrocarbons to be employed, the hydrocarbons then being led through, the reaction chamber heated up again and so on.

The employment of metallic catalysts, when working in this manner, has many objections which are perhaps due to the fact that the said heavy metals are oxidized during the heating up and give their oxygen wholly or partly to the carbon of the hydrocarbons during the splitting reaction. The hydrogen obtained is contaminated with carbon dioxide or carbon monoxide, at least at the start. Even the usually employed refractory materials, such as fire clay, which, besides usually only having a very slight catalytic activity, and which are mainly employed to provide a surface of contact, have a similar unfavorable effect. Refractory materials, such as fire clay always contain small amounts of metallic constituents or of constituents readily reduced to metals.

I have now found that mixtures of solid oxides which are substantially free from oxidizable metals, such as iron, nickel or cobalt, as such, or in the form of compounds which are reducible under the working conditions are very suitable as catalysts in the thermal splitting of hydrocarbons, in particular gaseous hydrocarbons of the aliphatic series, as for example methane, ethane or propane. For example, mixtures of two or more of the oxides of different metals from the class consisting of aluminium, boron, zirconium, silicon, cerium, thorium, or of the alkaline earth metals and the like may be employed. Gas mixtures containing hydrocarbons, such as natural gas, cracking gas, coke oven gas or fractions of these gases, may be employed instead of the hydrocarbons themselves.

The said mixtures of solid oxides have a better effect than solid oxides alone. Probably each oxide promotes the action of the other oxide admixed therewith so that they are mutual activators.

By oxidizable metals are meant those which are oxidized under the conditions prevailing during the heating up of the apparatus.

Also compounds of several solid oxides, such as aluminium silicate come into question as catalysts for the present process.

The process according to the present invention is carried out at high temperatures, preferably between 1000° and 1300° C. Any pressure, that is reduced, ordinary, or elevated pressures may be employed. Usually approximately atmospheric pressure is employed.

The following examples will further illustrate the nature of the present invention but the invention is not restricted to these examples. The parts are by weight.

Example 1

A mixture of 100 parts of aluminium hydroxide and 60 parts of zirconium oxide is brought into the form of cubes the edges of which are about 30 millimeters in length by making into a paste with a suitable binding agent, as for example water, or a dilute organic acid, shaping and drying. 40 liters of the catalyst thus obtained are charged into a reaction vessel constructed of refractory material, as for example a Cowper, and heated to about 1250° C. by burning methane with air. 40 cubic meters of methane per hour are then led at a pressure of about 20 millimeters mercury through the apparatus until the temperature has fallen to about 1200° C. The reaction vessel is then heated again and so on. An effluent gas having approximately the following composition is obtained:—

| | Per cent |
|---|---|
| Hydrogen | 91.8 |
| Carbon monoxide | 1.2 |
| Methane | 0.2 |
| Nitrogen | 6.8 |

If the apparatus be charged with lumps of chamotte, an effluent gas having approximately the following composition is obtained under the same conditions:—

| | Per cent |
|---|---|
| Carbon dioxide | 0.8 |
| Hydrogen | 77.8 |
| Carbon monoxide | 3.0 |
| Methane | 10.4 |
| Nitrogen | 8.0 |

Example 2

A catalyst is prepared in the manner described in Example 1 from 100 parts of magnesium oxide, 1 part of boric acid and 1 part of zirconium oxide. When methane is passed over this catalyst under the same conditions as set forth in Example 1 a gas mixture having approximately the following composition is obtained:—

| | Per cent |
|---|---|
| Hydrogen | 94 |
| Carbon monoxide | 0.6 |
| Methane | 0.4 |
| Nitrogen | 5.0 |

Example 3

Methane is passed under the conditions described in Example 1 over a catalyst prepared according to Example 1 from 100 parts of aluminium hydroxide, 20 parts of boric acid and 20 parts of silica. A gas having approximately the following composition is obtained:—

| | Per cent |
|---|---|
| Hydrogen | 89.4 |
| Carbon monoxide | 0.8 |
| Methane | 0.8 |
| Nitrogen | 9.0 |

It is not always possible to obtain a gas free from carbon monoxide since the methane employed which is obtained from technical processes usually contains small amounts of carbon dioxide and water which under the working conditions react with methane to form carbon monoxide.

What I claim is:—

1. In the production of hydrogen by catalytic thermal splitting of a hydrocarbon, the step which comprises treating said hydrocarbon at a high temperature in the presence of a catalyst consisting of a mixture of at least two solid oxides which are substantially free from substances comprising an oxidizable metal the oxide of which is reducible under the working conditions.

2. In the production of hydrogen by catalytic thermal splitting of a gaseous hydrocarbon of the methane series, the step which comprises treating said hydrocarbon at a high temperature in the presence of a catalyst consisting of a mixture of at least two solid oxides which are substantially free from substances comprising an oxidizable metal the oxide of which is reducible under the working conditions.

3. In the production of hydrogen by catalytic thermal splitting of methane, the step which comprises treating said methane at a high temperature in the presence of a catalyst consisting of a mixture of at least two solid oxides which are substantially free from substances comprising a metal of the iron group.

4. In the production of hydrogen by catalytic thermal splitting of a gaseous hydrocarbon of the methane series, the step which comprises treating said hydrocarbon at a high temperature in the presence of a catalyst consisting of a mixture of aluminium hydroxide and zirconium oxide.

5. In the production of hydrogen by catalytic splitting a gaseous hydrocarbon of the methane series, the step which comprises treating said hydrocarbon in the presence of a catalyst, consisting of a mixture prepared from about 100 parts of aluminium hydroxide and 60 parts of zirconium oxide, at a temperature between 1000° and 1300° C.

6. In the production of hydrogen by catalytic splitting methane, the step which comprises treating said hydrocarbon in the presence of a catalyst, consisting of a mixture prepared from about 100 parts of aluminium hydroxide and 60 parts of zirconium oxide, at a temperature between about 1200° and 1250° C.

7. In the production of hydrogen by catalytic splitting methane, the step which comprises passing said methane, at a temperature between about 1200° and 1250° C., over a catalyst consisting of a mixture prepared from about 100 parts of magnesium oxide, 1 part of boric acid and 1 part of zirconium oxide.

8. In the production of hydrogen by catalytic splitting methane, the step which comprises passing said methane, at a temperature between about 1200° and 1250° C., over a catalyst consisting of a mixture prepared from about 100 parts of aluminium hydroxide, 20 parts of boric acid and 20 parts of silica.

WILLIAM HENNICKE.